United States Patent
Braun

(10) Patent No.: US 8,523,298 B2
(45) Date of Patent: Sep. 3, 2013

(54) TENSIONING APPARATUS FOR AN ENDLESS TRACK

(75) Inventor: Arthur Braun, Deidesheim (DE)

(73) Assignee: Joseph Vögele AG, Ludwigshafen/Rhein (DE)

( * ) Notice: Subject to any disclaimer, the term of this patent is extended or adjusted under 35 U.S.C. 154(b) by 17 days.

(21) Appl. No.: 13/226,238

(22) Filed: Sep. 6, 2011

(65) Prior Publication Data

US 2012/0062025 A1 Mar. 15, 2012

(30) Foreign Application Priority Data

Sep. 14, 2010 (EP) .................................. 10009566
Jul. 15, 2011 (EP) .................................. 11005834

(51) Int. Cl.
*B62D 55/30* (2006.01)

(52) U.S. Cl.
USPC ............................................ 305/146; 305/152

(58) Field of Classification Search
USPC ................. 305/143, 146, 151, 152
See application file for complete search history.

(56) References Cited

U.S. PATENT DOCUMENTS

| | | | | |
|---|---|---|---|---|
| 3,647,270 A | * | 3/1972 | Althaus ......................... | 305/146 |
| 3,841,715 A | * | 10/1974 | Comer et al. ................. | 305/146 |
| 4,059,314 A | | 11/1977 | Amstutz | |
| 4,094,516 A | * | 6/1978 | Morley et al. ................. | 305/103 |
| 4,650,259 A | * | 3/1987 | Alexander et al. ............ | 305/146 |
| 5,851,058 A | * | 12/1998 | Humbek et al. ............... | 305/146 |
| 6,322,171 B1 | * | 11/2001 | Fornes ........................... | 305/143 |
| 7,226,137 B2 | * | 6/2007 | Fornes ........................... | 305/143 |
| 7,464,997 B2 | * | 12/2008 | Longley ......................... | 305/128 |
| 7,520,575 B2 | * | 4/2009 | Johnson ......................... | 305/144 |
| 7,922,266 B2 | * | 4/2011 | Dietrich ......................... | 305/145 |
| 2001/0037713 A1 | * | 11/2001 | Seyna et al. ................. | 83/698.41 |
| 2003/0117017 A1 | * | 6/2003 | Hoff ................................ | 305/143 |
| 2005/0218721 A1 | * | 10/2005 | Page et al. ..................... | 305/151 |
| 2007/0029878 A1 | | 2/2007 | Gaudreault et al. | |

FOREIGN PATENT DOCUMENTS

| | | |
|---|---|---|
| DE | 3725742 A1 | 3/1988 |
| DE | 29616216 U1 | 1/1997 |
| EP | 2050664 B1 | 4/2010 |
| JP | 62067882 A | 3/1987 |
| WO | WO0156867 A1 | 8/2001 |

OTHER PUBLICATIONS

A European Search Report mailed Oct. 5, 2012, which issued in corresponding EP Application Serial No. 11005834.4.

* cited by examiner

*Primary Examiner* — Jason Bellinger
*Assistant Examiner* — Jean Charleston
(74) *Attorney, Agent, or Firm* — Fish & Richardson P.C.

(57) ABSTRACT

In a tracklaying gear with a frame having an idler wheel linear guide in which at least one guide piece holding the idler wheel axle is movable, and on which a tensioning means of a tensioning device supported in the frame can act in the guidance direction, at least one mechanically guided and centered elastomer spring body is installed to bulge under axial compression, such that the spring body can be readjusted, the elastomer spring body consisting of an elastomer material largely incompressible as a spring.

13 Claims, 1 Drawing Sheet

TENSIONING APPARATUS FOR AN ENDLESS TRACK

Figure 1:
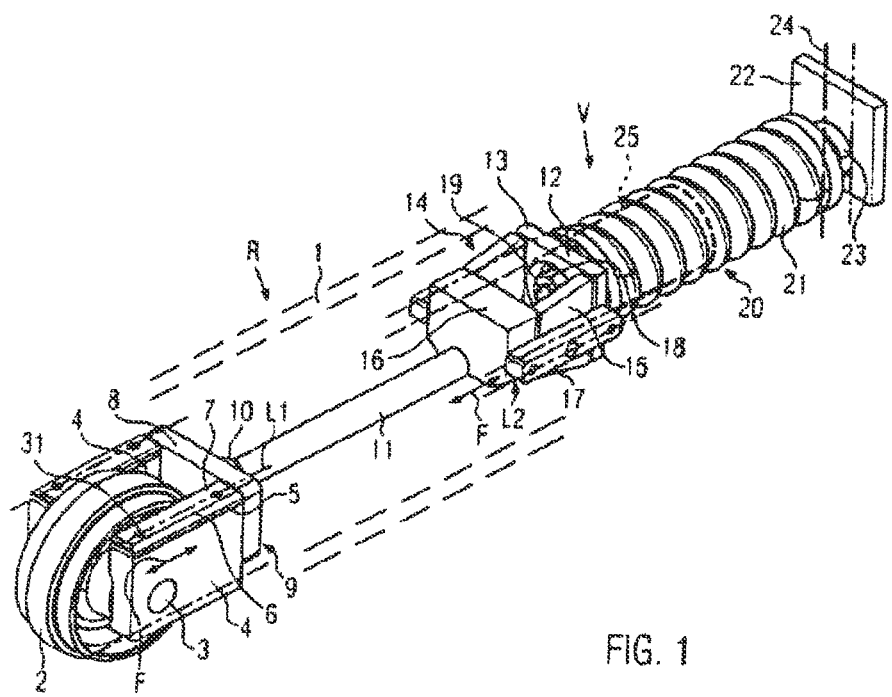

The invention relates to a tracklaying gear, in particular for a construction machine, such as a road finishing machine, with a frame comprising an idler wheel linear guide in which at least one guide piece holding the idler wheel axle is moveable, and on which the tensioning means of a tensioning device supported in the frame can act in the linear guidance direction In construction machines, such as in particular road finishing machines, the running gear in most cases comprises two crawler bogies each with one tracklaying gear per side. The tracklaying gear comprises a stable frame in which, besides track and carrier rollers and a drive tumbler (drive chain wheel), at least one idler wheel with a tensioning device for the crawler are arranged. The driving power is transmitted to the drive tumbler which, for example, pulls the lower run of the crawler and keeps it tightened. The tensioning device retains the crawler with the desired tension via the idler wheel. In case of shock loads, or in case of pinched objects, the idler wheel yields to the tensioning device. Different types of tensioning devices are in use. One type has a strong flat spiral or coil spring or an annular spring assembly (DE 296 06 295 U), and optionally a tensioning cylinder whose piston rod is pushed out via a grease gun by means of a grease filling until the crawler is pretensioned over the idler wheel with a slight slack. Another type comprises a cylinder-piston tensioning means (DE 35 26 437 A) which is filled with a viscous, compressible elastomer liquid (www.tfwfahrtechnik.ch, "elastomer tensioner") and creates pretension instead of a flat spiral or coil spring consisting of steel (DE 40 25 929 A). Another type comprises, as a tensioning means, a gas pressure spring with a nitrogen storage.

Such a tracklaying gear is disclosed in EP 2 050 664 A and contains, in the frame, the idler wheel linear guide configured as a U-shaped mouth, two idler wheels arranged on both sides of the frame whose common axle is held in the guide piece which is seated in the linear guide and supported by guide plates in the transverse direction. The tensioning device comprises, a tensioning member having, one or two parallel tensioning cylinders which act on a tension lever held in the frame. The tension lever in turn acts on the guide piece via a crosshead which compensates for the different relative motions of the guide piece and the tension lever in the power transmission. The tensioning member can be a hydraulic tensioning cylinder, or a mechanical tensioning unit or a pressure spring.

In connection with the tracklaying gear known from DE 296 16 216 U, tests with elastomer spring elements instead of mechanical coil springs are mentioned which, however, are qualified as being disadvantageous or useless due to their extremely temperature-dependent modulus of elasticity and very low pretensioning forces and block loads. The embodiment and installation of elastomer spring elements is not disclosed. In practice, however, these elastomer spring elements have been already tested in 1980 corresponding to www.tfwfahrtechnik.ch "elastomer tensioners" which were filled, as pretensioned cylinders, with a compressible transparent elastomer liquid.

JP 62-67882 A discloses a tracklaying gear is known in which the pretensioning device for the tensioning means of the tensioning device embodied as a coil spring comprises a protecting elastomer bellow.

The object underlying the present invention is to provide a tracklaying gear improved structurally in a load-oriented manner with respect to the idler wheel tensioning function and/or the idler wheel support in the frame, and especially to provide a tracklaying gear wherein the tensioning means can achieve high tensioning and dampening performance despite being of a reduced size.

The set object is achieved with the features of the present invention.

The available space can be better utilized if, as a tensioning means, at least one such elastomer spring body is installed which, being of a small size, is extremely efficient and above all has a very flat damping curve which is desirable especially in construction machines, such as road finishing machines. There, shock-like loads act on the idler wheel in a slow working drive operation as well as in quick transport drive. These loads have to be dampened. The at least one elastomer spring body as a tensioning means of the tensioning device results in a significant structural and load-oriented improvement of the tracklaying gear because the elastomer spring body, being of a relatively small size, is extremely efficient, can thus save much space and optimize the idler wheel tensioning function in a load oriented manner and the damping function with a desirable flat damping curve. This is in particular suitable for construction machines, such as road finishing machines, which must drive slow working drive speeds where high power is required and relatively higher transport drive speeds, where in either case a relatively high degree of uniformity is to be ensured and the noise is to be as low as possible (structure-borne noise transmission). For these are actually contrary demands on a tracklaying gear. The elastomer spring body, however, offers, apart from a high power density, the important advantage of a relatively large deformation stroke and a relatively flat damping curve, i.e. relatively uniform damping independent of the deformation stroke. Here, the elastomer spring body is embodied to be approximately cylindrical with largely flat end faces for force transmission and a guide pin longitudinal central bore. The elastomer spring body is installed axially such that it has sufficient clearance to the outside for bulging.

Such elastomer spring bodies, for example of high-strength natural rubber or synthetic rubber, are employed for damping in body component presses in the automobile industry, see, for example, the technical information brochure of the Company Effbe GmbH, "ELASTOMER FEDERN von EFFBE" 07/2003, pages 1-13 (Company Effbe GmbH, Hanauer Landstraβe 16, 63628 Bad Soden-Salmünster, Hessen, http://www.effbe.com).

As elastomer material for the elastomer spring body, high-strength natural and/or synthetic rubber is suited. Preferably, it is a chloroprene rubber or a polyurethane rubber having a Shore A hardness of >60 Shore, or even >70 Shore, preferably up to a maximum Shore A hardness of about 90 Shore or more.

Suitably, several elastomer spring bodies are connected in series and/or in parallel, where a series connection has the advantage of a relatively large deformation stroke. Then, spring plates should be inserted between the series-connected elastomer spring bodies, and a guide pin passing through them should be provided for mechanical guidance and centering. The elastomer spring body can be installed to be exposed, or it can be encapsulated with a radial clearance permitting bulging. The circular cylindrical shape of the elastomer body is a suitable option, other cross-sectional shapes could also be selected. Normally, the axial length of the elastomer spring body is greater than its outer diameter. Different specifications of elastomer spring bodies are commercially available at relatively low costs; they are permanently elastic and fracture-proof and can be employed within a wide temperature range. However, it can be necessary to compress the elastomer spring body before it is employed, e.g. ten times, to let it set. The temperature application range is, for example, between −20° C. to +80° C., and it can temporarily even range from −40° C. to 120° C. It is resistant to oil and lubricating oil, grease, alcohol, petroleum benzine, water, ozone, caustic solutions and acids. To ensure a spring-actuated spring application, pretension is suitable also due to the setting tendency and should be greater than the setting tendency. The possible spring excursion can be between about 30% and 40% of the axial length, where the setting tendency can be between about 3% to about 8%, starting from the original length.

When the elastomer spring body is not axially compressed, its axial length is suitably greater than the outer diameter to achieve a preferably long spring trajectory.

It can furthermore be advantageous to embody the end faces of the elastomer spring body to be flat, raised or countersunk.

The further linear guide minimizes unfavorable load situations for the idler wheel, for example by the tensioning device applying no moments of tilt onto the idler wheel, or only moments of tilt easily tolerable for an orderly idler wheel tensioning function in the crawler. This is because the further linear guide keeps the tensioning device stable and centered and transmits the tension forces or reaction forces of the idler wheel exclusively into the guidance direction without moments of tilt. This means that the idler wheel linear guide is completely isolated from transverse forces from the working of the tensioning device (when the crawler is tensioned in the one direction, when the idler wheel yields against the force of the tensioning device in the other direction), from components of force of the tensioning device oriented transversely to the guidance direction because transverse components are absorbed via the slider in the further linear guide.

A very stable and smooth-running guidance of the slider in the further linear guide is possible if the slider is embodied as a base of a portal structure with two guide strips situated externally at outer portal walls. A pressure element extending to the guide piece of the idler wheel is attached to a portal cross bar which connects the outer portal walls in a stabilizing manner. The guide strips take on the guide tasks for the slider in the further linear guide and are suitably attached to be replaceable. The portal structure furthermore provides clearance for equipment components moving through the slider while the elastomer spring body is working.

In a suitable embodiment, at least one idler wheel is arranged between two parallel guide pieces accommodating the idler wheel axle. Optionally, a pair of idler wheels is provided for the crawler and held at the two guide pieces. The guide pieces can be connected via a connecting body and form a stable, for example U-shaped, guiding structure component. The connecting body can comprise a connection for the pressure element or even be firmly connected to the pressure element. The pressure element transmits on the one hand the tension force of the elastomer spring body to the idler wheel, and on the other hand yielding movements of the idler wheel to the elastomer spring body. The two guide pieces generate a very stable support of the idler wheel in the frame of the tracklaying gear. As an alternative, one single guide piece for one idler wheel or for two idler wheels arranged at both sides of the guide piece could be provided and coupled with the pressure element.

To ensure a neat and smooth-running guidance of the idler wheel in the idler wheel linear guide, it is suitable to dispose, at least at the upper and bottom sides at the guide piece sliding linings where contact between guide surfaces occurs. The sliding linings could be made, for example, of wear resistant, well sliding Hardox material and are suitably fixed so that they can be replaced. To achieve structural improvement, mainly with respect to low running noises and also for damping the idler wheel, a damping layer is suitably disposed between the guide piece and each sliding lining. This damping layer can have the form of at least one plastic strip which is either inserted or connected to the guide piece and/or the sliding lining.

Suitably, the sliding lining and the damping layer are fixed to the guide piece by means of at least one spring fitting element extending into the guide piece approximately perpendicularly to the guidance direction. Such spring fitting elements are known, for example, from www.connexch.com "Connex® Feder-Pass-Elemente".

Figure 2:
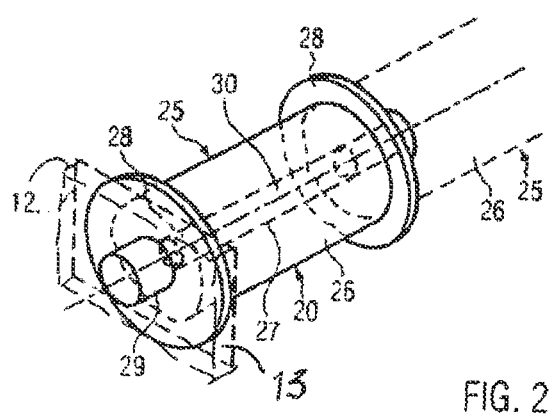

With reference to the drawings, embodiments of the subject matter of the present invention are illustrated. In the drawings:

FIG. 1 shows a perspective schematic representation of a tracklaying gear with an idler wheel, where structural features irrelevant for the invention, such as track rollers and carrier rollers, or a drive tumbler, and also a crawler are omitted for a better overview, and FIG. 2 shows a perspective representation of a tensioning element schematically indicated in FIG. 1 in the form of at least one elastomer spring body.

FIG. 1 illustrates a tracklaying gear R, in particular for a construction machine, such as a road finishing machine (not shown), where the tracklaying gear R comprises a frame 1 (for example an edgewise installed steel plate), at which, besides non-depicted track rollers and carrier rollers for a non-depicted crawler, a drive tumbler (drive chain wheel, not shown) can also be arranged, where the crawler is guided over an idler wheel 2 which provides a crawler tensioning function in the tracklaying gear R and pretensions the crawler by a tensioning device V, but yields to the force of the tensioning device V under shock loads. As an alternative, two or more idler wheels 2 lying one next to the other could also be provided (not shown).

The idler wheel 2 is movably guided with an idler wheel axle 3 in an idler wheel linear guide L1 of the frame 1 in a guidance direction F over two parallel, block-like guide pieces 4. Each guide piece 4 bears one sliding lining 6 each at least on the upper and the bottom sides, for example in the form of a strip of a wear resistant, easily sliding Hardox material. The sliding lining 6 is suitably attached to the guide piece 4 so as to be replaceable (by means of fixing elements 7). Between each sliding lining 6 and the guide piece 4, a damping layer 5 is provided, for example a plastic strip which is either loosely inserted or connected, e.g. firmly bonded, to the sliding lining 6 and/or the guide piece 4. The two guide pieces 4 are, in the illustrated embodiments, joined via a connecting body 8 in the form of a four-cornered stable plate to form a U-shaped guiding structure component 9, between the limbs of which the idler wheel 2 is accommodated so as to project at the top, the bottom and one front side. The idler wheel linear guide L1 can be shaped or installed in the frame 1 as a mouth or a shaft (not shown in detail) and acts on the guide piece 4 at least via the sliding linings 6.

The fixing element 7 suitably is a spring fitting element 31 which is fitted into bores approximately perpendicularly to the guidance direction F and extends into the guide piece 4. Such spring fitting elements 31 are spring steel sleeves longitudinally slotted, for example, in the shape of undulated teeth and consist of high-grade chrome vanadium steel, are easy to assemble and ensure a stable seat over long service lives when several components are joined.

At the connecting body 8, a connection 10, for example a pipe attachment, is provided for coupling the guiding structure component 9 to a pressure element 11, which, in the shown embodiment, is a circular pipe or a solid circular profile and extends essentially in parallel to the guidance direction F to a further linear guide L2 of the tracklaying gear R and thus to the tensioning device V. In the further linear guide L2, which has the same guidance direction F as the idler wheel linear guide L1, a slider 12 is movably guided, which is, for example, a square or round plate 13 with an internal bore 18 and serves as universal abutment for a tensioning means 20 of the tensioning device V. The slider 12 is supported e.g. in a portal structure 14 at portal side walls 15 which are interconnected via a portal cross bar 16 at which the pressure element 11 acts or is firmly mounted. A clearance is formed between the portal side walls 15 and the portal cross bar 16, for example for an equipment 19 of the tensioning device V which submerges into the portal structure 14 when the tensioning device V is compressed in the guidance direction F. Guide strips 17 are attached outside at the portal side walls 15 (as an alternative at the slider 12) and are guided in the further linear guide L2.

The tensioning means 20 is in FIG. 1 e.g. a coil or flat spiral spring 21 of spring steel which acts at the slider 12 and is supported at a plate 22 of an abutment 24 provided in the frame 1. Optionally, the tensioning device V contains an equipment component 23 for pretensioning the crawler (not shown) on the idler wheel 2 in the guidance direction F and to the left. The tensioning means 20 is mounted between the slider 12 and the plate 22 with axial pretension.

Instead of the illustrated flat spiral or coil spring 21 of steel, at least one elastomer spring body 25 (indicated in a dashed line) is installed in the tensioning device V, where then (not shown) the abutment 24 can be placed closer to the slide piece 12 than shown (saving assembly space).

The further linear guide L2, which is only schematically indicated in FIG. 1, can comprise guide tracks, shaped in the frame 1 or mounted there, for the guide strips 17 attached to the outer portal walls 15, optionally the portal cross bar 16 and/or the slider 12. The linear guides L1, L2 are suitably structurally separated and spaced apart in the guidance direction F, where the guidance directions F are the same or parallel. The further linear guide L2 absorbs transverse forces originating from the tensioning device V and ensures that the pressure element 11 transmits pressure forces to each guide piece 4 only in the guidance direction F (without moments of tilt), or that, when the idler wheel 2 yields in FIG. 1 to the right in the guidance direction F, no transverse forces or moments of tilt occur, as then the idler wheel linear guide L1 also absorbs such transverse forces and transmits them into the frame 1. The damping layer 5 reduces the running noise of the tracklaying gear R, especially at rather high travel speeds.

With the at least one elastomer spring body 25 (in FIG. 1 indicated in a dashed line) as tensioning means 20 of the tensioning device V, a considerable amount of assembly space can be saved, for example compared to flat spiral or coil spring tensioning means. Furthermore, by the two structurally separated linear guides L1, L2, the assembly space available in the tracklaying gear R can be better utilized, compared to a design where the tensioning device V directly acts at the idler wheel 2 or the guiding structure component 9, although such a solution can also be suitable, for example if the at least one elastomer spring body 25 is used as the tensioning means 20 which, being of a relatively small size, is characterized by high efficiency and a considerable deformation trajectory and exhibits a desirably flat damping curve.

The elastomer spring body 25 is shown better in FIG. 2 and is, for example, a largely circular cylinder with flat end surfaces at which spring plates 28, for example of steel, can abut. The size of the spring plates is larger than the radial deformation of the elastomer spring body 25 when it is axially compressed. A central longitudinal bore 27 can serve to accommodate an optionally provided guide pin 30 which ensures mechanical guidance and centering of the elastomer spring body 25 when it is axially compressed and extends through the spring plates 28 into a projection 29, which engages, for example, in FIG. 1 into the central longitudinal bore 18 of the slider 12, or if the elastomer spring body 25 is directly adjacent to the guiding structure component 9 (not shown) into the holder 10 of the connecting body 8, or into a bore in the connecting body 8.

Furthermore, FIG. 2 illustrates that several elastomer spring bodies 25 can be connected in series, preferably each via inserted spring plates 28 and a guide pin 30 then passing through them. As an alternative, several elastomer spring bodies 25 could be connected one next to the other in parallel (not shown). A parallel and series connection of the elastomer spring bodies is also possible, depending on the performance demands of the tensioning device V.

The elastomer spring body 25 consists e.g. of natural rubber or synthetic rubber, i.e. an elastomer material 26 which is incompressible as spring, but can bulge when it is compressed axially. In the installed state of the elastomer spring body 25, corresponding clearances for bulging must be provided. If only one elastomer spring body 25 is provided as tensioning means 20, a guide pin 30, and also the spring plates 28, can optionally be omitted. The end surfaces of the spring body 25 can be flat, i.e. plane, raised or countersunk. However, the support surfaces, for example, at the connecting body 8 or at the slider 12, should be smooth. The guidance and centering of the elastomer spring body 25 is ideally achieved with a guide pin 30 to avoid buckling. In a series connection, the individual spring trajectories add up, while the resiliencies remain the same. Here, the elastomer spring bodies 25 basically have to be guided, e.g. by the guide pin 30 that passes through.

The elastomer spring body 25 in FIGS. 1 and 2 has a cylindrical design with the central longitudinal bore 27, where usually the axial length is greater than the outer diameter in the original state. The natural rubber can be a chloroprene rubber, while the synthetic rubber can be a polyurethane rubber, where a Shore A hardness of >60, suitably >70 and up to 90 Shore or more are suitable. The axial spring trajectory is at the maximum between about 40% to 30% of the axial length or original length, and is at a lower Shore A hardness longer than at a greater Shore A hardness. The elastomer material 26 of the elastomer spring body 25 has a material-related setting tendency that can amount to about 3% to about 8% of its original length and reaches its limit after a certain number of load changes in a dynamic application. Suitably, the elastomer spring body 25 is pretensioned in the axial direction, for example with a factor of 1.1 to about 1.3. Here, pretension should be greater than the setting tendency. Before putting it into operation, i.e. before the final dynamic loading, the elastomer spring body 25 should be loaded and released several times, for example up to ten times, because it then no longer considerably changes its working behavior (set operating state). The temperature application range is between about −20° C. and +80° C., where temperatures of −40° C. are temporarily equally accepted as are temperatures of +120° C. The modulus of elasticity is reduced as temperature rises. The elastomer spring body 25 is in particular characterized by a relatively flat damping curve. Spring force can amount to several hundred thousand Newtons.

The invention claimed is:

1. Tensioning apparatus for a construction machine, comprising:
   a frame bearing an idler wheel linear guide, in which at least one guide piece holding an idler wheel axle is movable and which includes a linear guide for a slider movable in the same guiding direction and coupled with the guide piece, the slider arranged as a base in a portal structure with two guide strips situated externally at outer portal walls, and a longitudinally extending, cylindrical pressure element connected to a portal cross bar; and
   a tensioning means of a tensioning device supported in the frame and positioned to act in the linear guidance direction and having at least one elastomer spring body to apply tension to the tensioning device, the elastomer spring body being formed of an incompressible high-strength elastomer material as a spring, said elastomer material having a Shore A hardness of greater than 60 Shore and and a central longitudinal bore for a guide pin.

2. Tensioning apparatus according to claim 1, wherein the elastomer material of the elastomer spring body comprises high-strength natural or/and synthetic rubber, having a Shore A hardness of >60 Shore to about 90 Shore.

3. Tensioning apparatus according to claim 1, wherein a plurality of elastomer spring bodies are connected in series and/or parallel, with inserted spring plates and one guide pin passing through each of the central longitudinal bores.

4. Tensioning apparatus according to claim 1, wherein the elastomer spring body has a greater axial length than outer diameter in the uncompressed state.

5. Tensioning apparatus according to claim 1, wherein at least one idler wheel is arranged between two parallel guide pieces accommodating the idler wheel axle, the guide pieces being connected in a U-shaped guiding structure component with a connecting body, providing a connection for the longitudinally extending, cylindrical pressure element, the connection extending to the slider on which the elastomer spring body acts.

6. Tensioning apparatus according to claim 2, wherein a plurality of elastomer spring bodies are connected in series and/or in parallel with inserted spring plates and a guide pin passing through each of the central longitudinal bores.

7. Tensioning apparatus according to claim 1 wherein the construction machine comprises a road finishing machine.

8. A road finishing machine, comprising: a frame, an idler wheel linear guide on the frame and having at least one movable guide piece holding an idler wheel axle and which includes a linear guide for a slider movable in the same guiding direction and coupled with the guide piece, the slider arranged as a base in a portal structure with two guide strips situated externally at outer portal walls, and a longitudinally extending, cylindrical pressure element connected to a portal cross bar, and a tensioning device supported on the frame and positioned to act in a linear direction on the idler wheel linear guide and having at least one elastomer spring body to apply tension to the tensioning device, the elastomer spring body comprising an incompressible high strength elastomer material and having a cylindrical configuration with and a guide pin located in a central longitudinal bore of the elastomer spring body.

9. Road finishing machine according to claim 8 wherein the elastomer material comprises chloroprene rubber or polyurethane rubber.

10. Tensioning apparatus according to claim 1 wherein the elastomer comprises chloroprene rubber or polyurethane rubber.

11. Road finishing machine according to claim 9 wherein the elastomer material has a Shore A hardness>60 Shore.

12. Tensioning apparatus according to claim 2 wherein the elastomer has a Shore A hardness of between >70 Shore and about 90 Shore.

13. Tensioning apparatus according to claim 2 wherein the elastomer material comprises chloroprene rubber or polyurethane rubber.

* * * * *